US011082505B2

(12) United States Patent
Smith-Denny et al.

(10) Patent No.: US 11,082,505 B2
(45) Date of Patent: Aug. 3, 2021

(54) DYNAMIC DISCOVERY OF AVAILABLE STORAGE SERVERS

(71) Applicant: Cisco Technology, Inc., San Jose, CA (US)

(72) Inventors: Oliver David Smith-Denny, San Jose, CA (US); Gian Carlo Boffa, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/525,233

(22) Filed: Jul. 29, 2019

(65) Prior Publication Data

US 2021/0037105 A1 Feb. 4, 2021

(51) Int. Cl.
*H04L 29/08* (2006.01)
*H04L 12/46* (2006.01)
*H04L 12/18* (2006.01)
*H04L 29/06* (2006.01)

(52) U.S. Cl.
CPC ............ *H04L 67/16* (2013.01); *H04L 12/185* (2013.01); *H04L 12/4641* (2013.01); *H04L 67/1097* (2013.01); *H04L 67/141* (2013.01); *H04L 63/101* (2013.01)

(58) Field of Classification Search
CPC . H04L 67/16; H04L 12/4641; H04L 67/1097; H04L 12/185; H04L 67/141; H04L 63/101
See application file for complete search history.

(56) References Cited

U.S. PATENT DOCUMENTS

| 7,281,062 B1* | 10/2007 | Kuik | G06F 13/385 370/395.52 |
| 7,522,616 B2* | 4/2009 | Thompson | H04L 67/1097 370/401 |
| 2009/0187668 A1* | 7/2009 | Arendt | H04L 67/1097 709/230 |
| 2009/0303902 A1* | 12/2009 | Liu | H04L 45/00 370/254 |
| 2010/0027551 A1* | 2/2010 | Arkin | H04L 63/10 370/400 |

(Continued)

*Primary Examiner* — William G Trost, IV
*Assistant Examiner* — Abdelbasst Talioua
(74) *Attorney, Agent, or Firm* — Lee & Hayes, P.C.

(57) ABSTRACT

In one embodiment, a first server computing is configured to send, to a network component, a request to subscribe to a multicast group. In addition, the first server computing device may receive a message sent from a second server computing device to the multicast group. The first server computing device may determine, from the message, an internet protocol (IP) address and port number associated with the second server computing device. In addition, the first server computing device may determine that the first server computing device has not previously received information associated with the second server computing device. The first server computing device may cause a connection to be established between the first server computing device and the second server computing device, the connection for enabling the first server computing device to determine whether the second server computing device offers storage for the first server computing device.

17 Claims, 7 Drawing Sheets

(56) References Cited

U.S. PATENT DOCUMENTS

| | | | |
|---|---|---|---|
| 2013/0152191 A1* | 6/2013 | Bright | H04L 63/0218 726/14 |
| 2014/0006502 A1* | 1/2014 | Gandhi | G06F 9/52 709/204 |
| 2014/0297845 A1* | 10/2014 | Tamura | G06F 11/2094 709/224 |
| 2016/0203000 A1* | 7/2016 | Parmar | H04L 67/34 713/2 |
| 2017/0034008 A1* | 2/2017 | Puttagunta | H04L 12/6418 |
| 2017/0083242 A1* | 3/2017 | Sullivan | H04L 67/1095 |
| 2018/0332434 A1* | 11/2018 | Kulkarni | H04W 4/35 |
| 2020/0004650 A1* | 1/2020 | Hanko | G06F 3/0631 |

* cited by examiner

DYNAMIC DISCOVERY OF AVAILABLE STORAGE SERVERS

TECHNICAL FIELD

The present disclosure relates generally to a dynamic discovery service for enabling host servers in need of storage to discover target servers offering storage.

BACKGROUND

In today's digital world, service providers often manage and provide network computing resources to users to fulfill needs of the users without the users having to invest in and maintain their own computing infrastructure. For example, cloud computing often involves the use of networks of data centers which house servers, routers, and other devices that provide computing resources to users such as compute resources, networking resources, storage resources, database resources, application resources, and so forth. Users may be allocated portions of the computing resources, including portions of one or more host servers that may provide compute functionality and one or more target servers that may provide storage for use by the host servers.

In some instances, a network administrator may create an access control list (ACL), specifying which portions of which target servers are reserved for which host servers. For instance, a first host server may be assigned one or more storage spaces on one or more first target servers, a second host server may be assigned one or more storage spaces on one or more second target servers (which could include some or all of the first target servers), and so forth. Therefore, each host server in a particular network must identify which one or more target server offers the host server storage. While some transport protocols, (such as Fibre Channel) provide for automatic discovery of such target servers for some types of storage protocols (such as NVM Express (NVMe), other transport protocols do not. In these latter instances, a user of the host server must first identify that target servers offer storage for the host server and then manually enter information for connecting to these storage servers, such as the internet-protocol (IP) addresses of these target servers and port numbers of the target servers over which they implement the storage protocol, such as NVMe. Given the above, it may be advantageous to provide a dynamic discovery process for host servers utilizing transport protocols that are unsupported in current discovery processes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
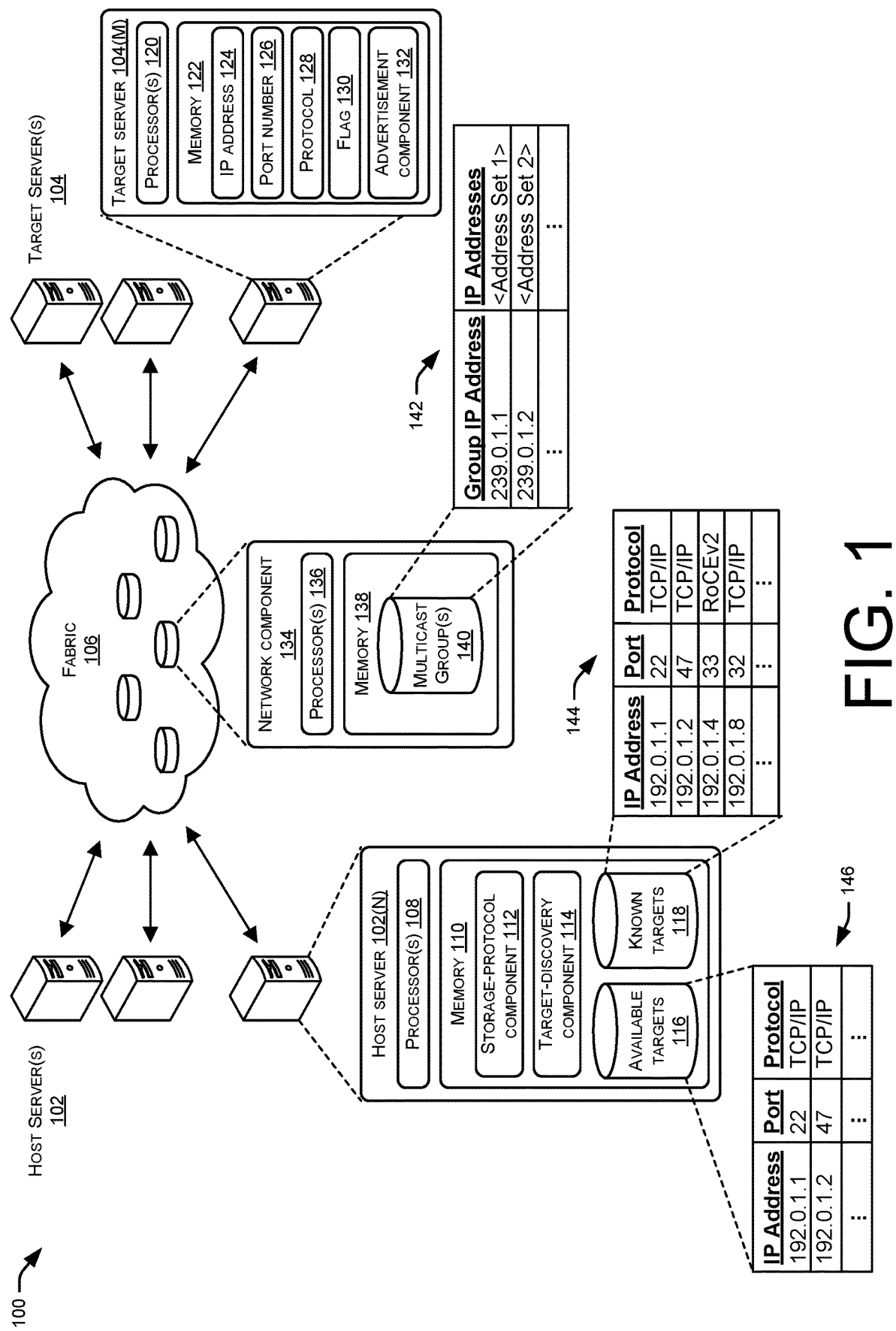
FIG. 1 illustrates a system-architecture diagram of an example environment in which host servers discover available storage offered by target servers. In this environment, each host server may subscribe to a multicast group maintained within a fabric, while each target server may periodically send information for enabling each host server to connect to the respective target server for determining whether the respective target storage has storage for respective host server.

This disclosure describes, in part, a first server computing configured to send, to a network component (e.g., a switch, router, etc.), a request to subscribe to a multicast group. In addition, the first server computing device may be configured to receive a message sent from a second server computing device to the multicast group. The first server computing device may determine, from the message, an interne protocol (IP) address associated with the second server computing device and a port number for establishing a connection to the second server computing device. In addition, the first server computing device may be configured to determine, based at least in part on the IP address, that the first server computing device has not previously connected with the second server computing device. The first server computing device may cause a connection to be established between the first server computing device and the second server computing device, the connection for enabling the first server computing device to determine whether the second server computing device offers storage for the first server computing device.

This disclosure also describes, in part, a first server computing configured to send, to a network component, a request to subscribe to a multicast group. In addition, the first server computing device may be configured to receive a message sent from a second server computing device to the multicast group. The first server computing device may determine, from the message, that an amount of available storage on the second server computing device has changed. The first server computing device may cause a connection to be established between the first server computing device and the second server computing device, the connection for enabling the first server computing device to determine whether the second server computing device offers storage for the first server computing device.

In addition, this disclosure describes, in part, a first server computing configured to send, to a network component, a request to subscribe to a multicast group. In addition, the first server computing device may be configured to receive a message sent from a second server computing device to the multicast group. The first server computing device may determine, from the message, a protocol (e.g., a transport protocol) supported by the second server computing device. In addition, the first server computing device may be configured to determine that the first server computing device also supports the protocol supported by the second server computing device. The first server computing device may cause a connection to be established between the first server computing device and the second server computing device, the connection for enabling the first server computing device to determine whether the second server computing device offers storage for the first server computing device.

Additionally, the techniques described herein may be performed by a system and/or device having non-transitory computer-readable media storing computer-executable instructions that, when executed by one or more processors, performs methods described herein.

Example Embodiments

This disclosure describes techniques for enabling host servers in a network (e.g., a Virtual Local Area Network (VLAN)) to discover available storage offered by target servers in the network without requiring human operators of the host servers to specify address information for connecting to the target servers offering the storage. Therefore, these techniques allow host servers to dynamically discover available storage offered by the target servers, thus enabling automation of the discovery process and aiding scalability of deployment of the host servers.

In some instances, data centers and/or other networked groups of computing devices includes one or more host servers and one or more target servers. The one or more host servers may comprise "compute servers" configured to perform data processing, while the one or more target servers may comprise "storage servers" configured to provide storage for results computed by the one or more host servers. In some instances, an individual server may comprise both a host server and a target server, in that the individual server is configured to perform both roles. In other instances, an individual server has a single, defined role as a host server or target server.

With these data centers and/or groups of networked computing devices, system administrators or other actors may generate an access control list (ACL) indicating which portions of which target servers are to be allocated to which host servers. That is, the ACL may specify which portions of storage of each target server is assigned for use by which host servers. For instance, the ACL may specify that a first host server is allowed to use one or more first storage spaces (e.g., namespaces) available on a first, identified target server, one or more second storage spaces available on a second, identified target server, and so forth. The ACL may similarly indicate which storage spaces are reserved or otherwise available for a second host server in the network, a third host server in the network, and so forth.

However, in order for a host server to utilize a portion of a target server (e.g., a namespace) that has been reserved for the host server, the host server is to store an indication of this target server such that the host server "knows" where to store result data generated by the host server. That is, in order to utilize the storage space of the target server made available for the host server, the host server is to be programmed to store information for contacting this target server. This information may comprise an internet protocol (IP) address of the target server, a port over which a connection with the target server may be established, at least one protocol (e.g., a storage protocol, a transport protocol, and/or the like) utilized by the target server, and so forth.

In some instances, the host server and target server may utilize a storage protocol for establishing a connection between the servers and storing data generated at the host server on the target server. The storage protocol may comprise Non-Volatile Memory Express (NVMe), Small Computer System Interface (SCSI), or the like. In some of these instances, a storage protocol may be used to both inform a host server as to the target server at which the host server may store its data, as well as enable the connection between the host server and the target server. For example, the storage protocol may enable access to a discovery controller of the target server at which the host server is able to store data, such that the host server may store the information (e.g., IP address, port, transport protocol, etc.) for connecting with the target server for storing data. In addition, the storage protocol may facilitate the connection between the host server and the target server upon the host server requesting to store data at the target server.

In other instances, meanwhile, the storage protocol might not inform a host server as to the target server(s) at which the host server may access available storage. In these instances, a system administrator or other human user may identify, from the ACL, information regarding the target servers available for use by the host server and may manually enter this information into the host server for establishing a connection with the target server. Using NVMe as an example, this storage protocol may provide a dynamic-discovery mechanism for host servers that communicate using one or more certain protocols (e.g., Fibre Channel (FC)), while not providing a dynamic-discover mechanism for host servers that communicate using one or more other protocols (e.g., Transport Control Protocol (TCP) and Remote Direct Memory Access over Converged Ethernet v2 (RoCEv2)). Therefore, host servers utilizing the latter protocols may be unable to discover available target servers without information associated with these target servers being explicitly specified by a human user.

The techniques described here, however, provide a dynamic-discovery process to enable these host servers to dynamically and automatically discover these target servers. To begin, when a host server is deployed on a network (or at any other time) the host server may be configured to request to subscribe to a multicast group to which target servers are configured to send periodic advertisement messages. That is, the host server may send a request to a network component to subscribe to a specified multicast group associated with the dynamic-discovery process. The network component may comprise a switch, a router, or any other type of computing device within a fabric, a data center, a network, or the like.

Upon receiving the request from the host server, the network component may add, to the multicast group, an IP address associated with the host server. As is known, a multicast group may be associated with a multicast-group IP address, such that messages sent to this multicast-group IP address are relayed to each IP address associated with the group. Thus, upon the IP address of the example host server being added to the multicast-group IP address, the host server may begin receiving messages sent with the network to the multicast-group IP address. It is also noted that in addition to adding the IP address of the host server to the multicast-group IP address, the network component may also send an updated list of IP addresses associated with the multicast-group IP address to other network components within the network, as is also known.

Target servers within the network, meanwhile, may be configured to send, to the specified multicast-group IP address, one or more advertisement messages, with these message include information for connecting to the respective target server. For instance, a first target server may send, to the multicast-IP address, an IP address of the first target server, a port over which the first target server is configured to receive storage-protocol (e.g., NVMe, SCSI, etc.) requests, a protocol (e.g., a storage protocol, a transport protocol, and/or the like) supported by the first target server, and/or other information. In some instances, each target server within the network is configured to send these advertisement messages periodically (e.g., every second, every minute, etc.), in response to a triggering event, and/or the like.

Upon a network component in the network receiving an advertisement message specifying information associated with a target server, the network component may send the message to each IP address associated with the multicast-IP address, including the example host server discussed above. Upon receiving the advertisement message, the host server may initially identify the message as an advertisement message. For example, the host server may analyze a header or other portion of the message to determine that the received message comprises an advertisement message associated with the dynamic-discovery process within the network. After making this determination, the host server may analyze the advertisement message to identify the IP address of the target server, the port number over which the target server is accepting storage requests, a protocol(s) supported by the target server, and/or the like.

Upon identifying this information, the host server may be configured to determine whether to establish a connection with the specified target server for determining whether the target server offers storage for the host server. For example, the host server may determine whether it has previously received information associated with the target server by, for example, accessing a known-target list stored at or otherwise accessible to the host server. The known-target list may indicate each target server that the host server has previously "learned" about—that is each target server from which the host server has received an advertisement message—and may store information regarding each target server on the list, such as the IP address of the target server, the port number used by the target server, the protocol(s) supported by the target server, and/or the like.

If the host server determines that it has already "seen" the target server, then the host server may determine whether the advertisement message indicates whether available storage at the target server has changed since the last advertisement message sent by the target server. For example, the advertisement message may include a flag that, if set, indicates that the target server has added and/or removed one or more storage spaces since sending the last advertisement message. If the advertisement message does not indicate that the available storage has changed (e.g., because the flag is not set), then the host server may refrain from establishing a connection with the target server.

If, however, the host server has not yet "seen" the target server (e.g., because the IP address of the target server does not appear in the known-target list) and/or the advertisement message indicates that the available storage of the target server has changed, then the host server may determine whether the host server supports at least one protocol supported by the target server, as indicated by the advertisement message. If the host server does not (e.g., because the target server supports RoCEv2 and the host server does not), then the host server may refrain from attempting to establish a connection with the target server. If the host server does support at least one protocol supported by the target server, then the host server may attempt to establish a connection using the IP address, port number, and/or protocol specified in the advertisement message. In some instances, the host server invokes a connection process provided by the storage protocol, such as NVMe, SCSI, or the like.

Upon establishing a connection with the target server, the host server may determine whether the target server offers available storage for the host server. For example, the storage protocol, such as NVMe, may perform a process to determine whether the target server includes any storage space available for the host server (e.g., as specified by the ACL of the network). If so, then the host server may update an available-target list to indicate the target server. The available target list may store information regarding each target server that offers storage for the host server, such as an IP address of the respective target server, a port number over which the respective target server executes requests associated with the storage protocol, a protocol(s) (e.g., a storage protocol, a transport protocol, and/or the like) supported by the respective target server, one or more storage-space identifiers of respective storage space(s) available to the host server at the target server, and/or the like. Again, the storage protocol itself may provide a process for maintaining and updating this list.

If, however, the target server does not offer storage for the host server, then the host server may refrain from updating the available-target list. In instances where the host server had not yet seen the IP address of the target server, however, the host server may update the known-target list. In instances where the host server had previously seen the IP address of the target server, but the advertisement message indicated that storage of the target server had changed, the host server may refrain from updating the known-target list.

Given that each target server in the network may be configured to periodically send respective advertisement messages to the multicast group and given that each host server may be a member of the multicast group, each host server is able to discover available storage in the network for the respective host server, even as the available storage changes. That is, each host server may be configured to receive advertisement messages and determine whether to attempt to establish a connection with the respective target server associated with the advertisement message. If the host server determines to establish a connection with a target server, the host server may determine, via the connection, whether the target server offers storage for the host server. If so, the host server may store a corresponding indication such that the target server may be readily access if the host server later has storage requirements.

The techniques described herein thus provide a dynamic discovery process and, thus, provides various improvements and efficiencies with respect to the deployment of host servers within data centers or other network-computing environments. For instance, this dynamic discover process enables host servers to automatically identify available storage, without requiring a human operator to manually connect to each target server in the network to locate this available storage. This automated and dynamic process allows a network to scale to any number of host servers, without being restricted based on human operators needing to provision each individual host server.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which one or more host servers 102 in a network discover available storage offered by one or more target servers 104 in the network. In this environment, each host server may subscribe to a multicast group maintained within a fabric 106 of the network, while each target server may periodically send information for enabling each host server to connect to the respective target server for determining whether the respective target storage has storage for respective host server.

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, an example host server 102(N) includes one or more hardware processors 108 (processors) configured to execute one or more stored instructions. The processor(s) 108 may comprise one or more cores. Further, the host server 102(N) may include one or more network interfaces configured to provide communications between the host server 102(N) and other devices, such as user devices, network components, the target servers 104, and so forth. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The host server 102(N) may include memory (e.g., non-transitory computer-readable media) 110 that stores one or more operating systems that generally support basic functions of the host server 102(N). The memory 110 may further store a storage-protocol component 112, a target-discovery component 114, an available-target datastore 116, and a known-target datastore 118. The storage-protocol component 112 may comprise computer-executable instructions that, when executed by the processors 108, executes one or more storage protocols (e.g., NVMe, SCSI, etc.) for storing data generated at the host server 102(N) on one or more target servers 104. As described above, in some instances, the storage-protocol component 112 may automatically discover target servers offering storage for the host server 102(N), while in other instances the storage-protocol component 112 might not do so. For example, in instances where the host server 102(N) interacts with a target server using NVMe over FC, the storage-protocol component 112 may automatically discover available storage spaces for the host server offered by respective target servers. In instances where the host server 102(N) interacts with a target server using NVMe over TCP/IP or NVMe over RoCEv2, however, the storage-protocol component 112 may be unable to dynamically identify the available storage.

The target-discovery component 114, however, is configured to automatically and dynamically identify available storage for the host server 102(N) in instances where the storage-protocol component 112 is unable to do so. As introduced above and described in detail above and below, the target-discovery component 114 may identify this available storage by subscribing to a multicast group to which the target servers 104 send periodic advertisement messages. Upon receiving an advertisement message from a target server, the target-discovery component 114 may update the datastore 118 of known target servers in the environment. Further, the target-discovery component 114 may, in some instances, establish a connection to one or more of these target servers 114 and, upon determining that a respective target server offers storage for the host server 102(N), may update the datastore 116 of target servers offering storage for the host server 102(N).

FIG. 1 further illustrates an example target server 104(M), which includes one or more hardware processors 120 (processors) configured to execute one or more stored instructions. The processor(s) 120 may comprise one or more cores. Further, the target server 104(M) may include one or more network interfaces configured to provide communications between the target server 104(M) and other devices, such as user devices, network components, the host servers 102, and so forth. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The target server 104(M) may include memory (e.g., non-transitory computer-readable media) 122 that stores one or more operating systems that generally support basic functions of the target server 104(M). The memory 122 may further store configuration information of the target server 104(M), such as an IP address 124 of the target server 104(M), a port number 126 the target server 104(M) over which the target server establishes storage-protocol (e.g., NVMe, etc.) connections, one or more protocols 128 supported by the target server 104(M), and a flag 130 indicating whether storage of the server 104(M) has recently changed (as described below), and so forth. The protocols 128 may comprise storage protocols, transport protocols, and/or the like. For instance, the advertisement messages may indicate one or more storage protocols supported by the server 104(M) (e.g., NVMe, SCSI, etc.), one or more transport protocols supported by the server 104(M) (e.g., TCP/IP, FC, RoCEv2, etc.) and/or a combination thereof (e.g., NVMe over TCP, NVMe over RoCEv2, etc.).

In addition, the memory 122 may store an advertisement component 132 that is configured to periodically generate and send advertisement messages containing some or all of the configuration information, such as the IP address 124, the port number 126, and/or the protocol(s) 128 supported by the target server 104(M). In some instances, the advertisement component 132 may send these messages to the multicast group to which the host servers 102 have subscribed.

In this regard the environment 100 further illustrates the network fabric 106, which may comprise an array of network components, such as routers, switches, load balancers, and/or other types of computing devices. As illustrated, the fabric 106 illustrates an example network component 132 (e.g., a router, a switch, etc.) that includes one or more hardware processors 136 (processors) and memory 138, each of which have similar or the same characteristics described above with reference to the host and target servers. Also as illustrated, the memory 138 may include a datastore 140 of one or more multicast groups within the environment 100, each of which may be associated with a respective multicast IP address. As is known, each multicast group may be associated with one or more server IP addresses associated with respective servers that have subscribed to the multicast group. As an example, a list 142 illustrates, for example, a first multicast IP address may be associated with a first set of device IP addresses, a second multicast IP address may be associated with a second set of device IP addresses, and so forth. Thus, when a device, such as the example target server 104(M) sends a message to a multicast-group IP address, the network component 132 may route this message to each device (e.g., each host server) that has subscribed to this group. Also as is known, the information stored by the network component 134 in the datastore 140 may be distributed within other network components in the fabric 106 such that each network component is able to distribute received messages to the appropriate set of IP addresses.

To provide an example envision that the example host server 102(N) requests to subscribe to the first multicast group illustrated by the list 142. In response to receiving this request, the network component 134 may add the IP address of the host server 102(N) to the first set of IP addresses associated with the group. Further, the example target server 104(M) may later send a periodic advertisement message to the IP address ("239.0.1.1") associated with this first multicast group. The advertisement message may comprise the IP address 124, the port number 126, and the protocol(s) 128 associated with the target server 104(M). It is to be appreciated that the example IP addresses described herein and listed in FIG. 1 are merely illustrative and provided as examples.

In some instances, the message may also indicate whether available storage of the target server 104(M) has changed since the last time that the target server 104(M) sent an advertisement message. For example, the message may set the flag 130 if one or more storage spaces have been added or removed since the target server 104(M) last sent an advertisement message.

Upon receiving this advertisement message, the network component 134, and other network components in the fabric 106, may identify the IP address of the multicast group (e.g., specified in the header of the message) and may distribute the message to each IP address associated with the multicast-group IP address. As such, the example host server 102(N) may receive the message initially sent from the target server 104(M). Upon receiving the message, the host server 102(N) (e.g., the target-discovery component 114) may identify one or more pieces of the information in the message, such as the IP address 124, the port number 126, the protocol(s) 128, and/or whether the flag 130 has been set. For example, the host server 102(N) may identify the IP address and may compare this IP address to a list 144 stored in the known-target datastore 118. This list 144 may indicate those target servers that the host server 102(N) has previously seen, such as those servers for which the host server has previously received an advertisement message. The list 144 may also store additional information, such as port numbers over which these respective target servers establish these storage-protocol connections, protocol(s) supported by the respective target servers, and so forth.

If the target-discovery component 114 determines that it has already seen the IP address of the target server 104(M), then the target-discovery component 114 may determine whether the flag in the message has been set to indicate that available storage of the target server 104(M) has recently changed. If so, then the target-discovery component 114 may cause a connection to be established between the host server 102(N) and the target server 104(M) for determining whether the target server 104(M) offers storage for the host server 102(N). For example, the target-discovery component 114 may instruct the storage-protocol component 112 to establish a connection between the host server 102(N) and the target server 104(M) to make this determination. If the storage-protocol component 112 determines, based on the connection, that the target server 104(M) offers storage for the host server 102(N), then the storage-protocol component 114 may update a list 146 maintained by the available-target datastore 116. This list may indicate information associated with target servers that offer storage for the host server 102(N), such as respective IP addresses, port numbers over which to establish these storage-protocol connections, protocol(s) supported by respective target servers, and so forth. It is noted that while this figure depicts IPv4 addresses, the techniques apply equally to any other version of IP. If, however, the flag hasn't been set, then the target-discovery component 114 may refrain from establishing a connection.

In another example, the target-discovery component 114 may determine that the list 144 does not include the IP address 124 of the target server 104(M) indicated in the advertisement message. In these instances, the target-discovery component 114 may determine whether the protocol(s) 128 (e.g., a storage protocol, a transport protocol, and/or the like) specified in the message include a protocol also supported by the host server 102(N). If not, the target-discovery component 114 may update the list 144 to indicate the IP address (and potentially other information) from the message but may refrain from establishing a connection with the target server 104(M). If, however, the target-discovery component 114 determines that the host server 102(N) supports one of the protocols specified in the advertisement message, then the target-discovery component 114 may cause a connection to be established for determining whether the target server 104(M) offers storage for the host server 102(N). For example, the target-discovery component 114 may instruct the storage-protocol component 112 to establish a connection between the host server 102(N) and the target server 104(M) to make this determination. If the storage-protocol component 112 determines, based on the connection, that the target server 104(M) offers storage for the host server 102(N), then the storage-protocol component 114 may update a list 146 maintained by the available-target datastore 116.

Figure 2:
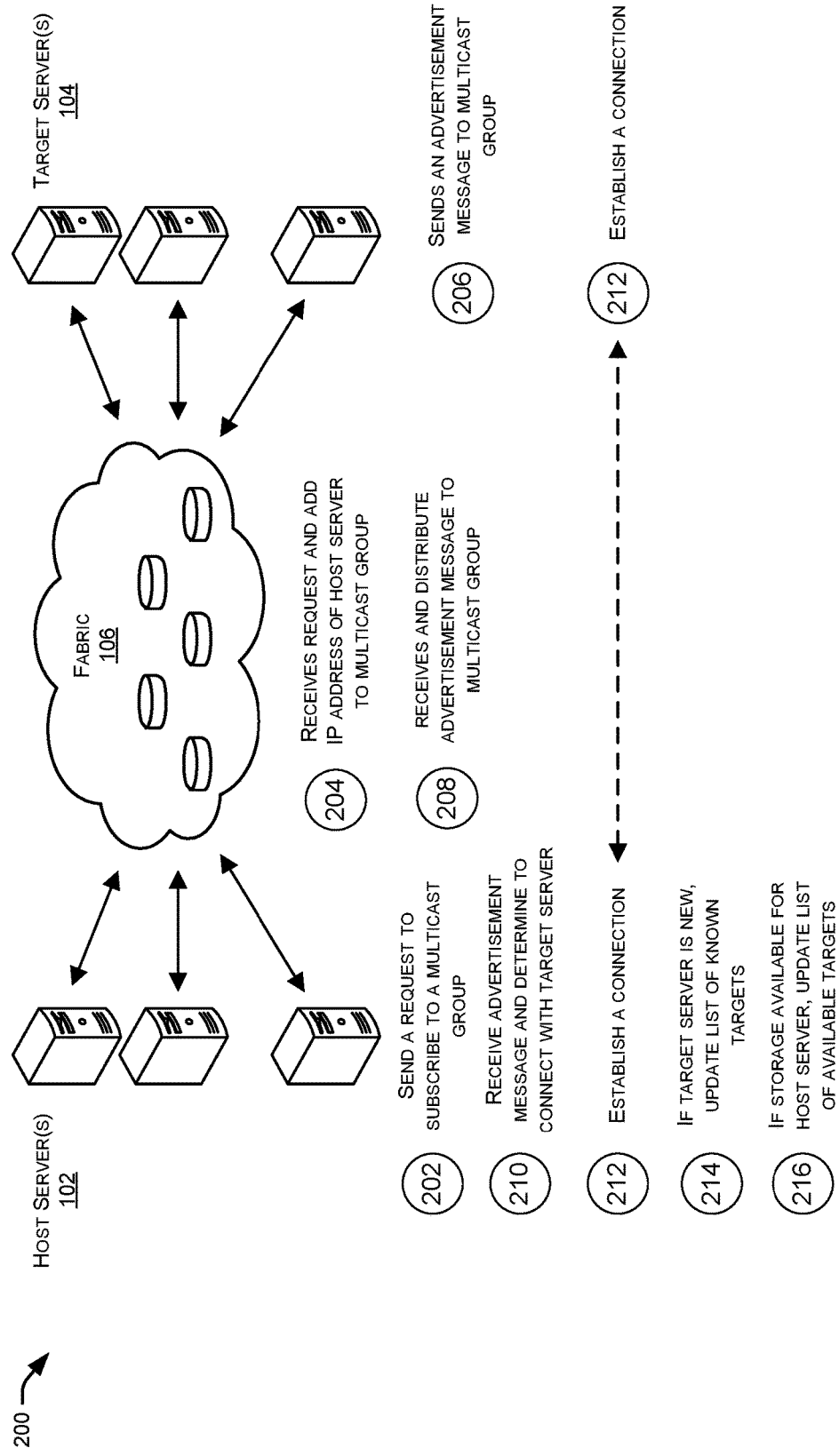
FIG. 2 illustrates an example flow of operations within the environment of FIG. 1 in which an example host server may subscribe to a multicast group and an example target server may send a message to the multicast group advertising information for connecting to the target server. In response to receiving the message, the host server may establish a connection to the target server for determining whether the target server offers storage for the host server.

FIG. 2 illustrates an example flow of operations 200 within the environment of FIG. 1 in which an example host server may subscribe to a multicast group and an example target server may send a message to the multicast group advertising information for connecting to the target server. In response to receiving the message, the host server may establish a connection to the target server for determining whether the target server offers storage for the host server.

As an operation 202, the example host server 102(N) sends a request to subscribe to a multicast group associated with receiving storage-protocol advertisement messages from target servers in the network. At an operation 204, a network component 132 receives the request and adds the IP address of the host server 102(N) to the multicast group. Sometime thereafter, an example target server 104(M) generates and sends, at an operation 206, an advertisement message to the advertisement-message multicast group. This advertisement message may comprise information such as an IP address of the target server, a port number of which the target server establishes storage-protocol connections, whether available storage of the target server has recently changed, protocol(s) supported by the target server, and so forth.

At an operation 208, one or more network components in the network receives the message, identifies the specified multicast-group IP addresses, and distributes the advertisement message to the group of IP addresses associated with the multicast group. At an operation 210, the example host server receives the advertisement message and determines, from information specified in the message, whether to connect to the target server associated with the message for determining whether the target server offers storage for the host server. As described in detail below with reference to FIG. 3, the host server may examine information such as the IP address of the target server, a protocol supported by the target server, whether the message indicates that storage of the target server has recently changed, and/or the like for determining whether to establish the connection.

In this example, the host server determines to establish this connection and, thus, establishes the connection at an operation 212. Upon establishing the connection, the host server may determine whether the target server offers storage for the host server. At an operation 214, the host server may update a list of known targets if the target server is "new" to the host server; that is, if the host server had not previously seen the target server. In addition, if the target server does in fact offer storage for the host serer, then at an operation 216 the host server may update a list of available target servers, such that the host server may utilize storage of the target server at a later time when the host server has a need for storage.

Figure 3:
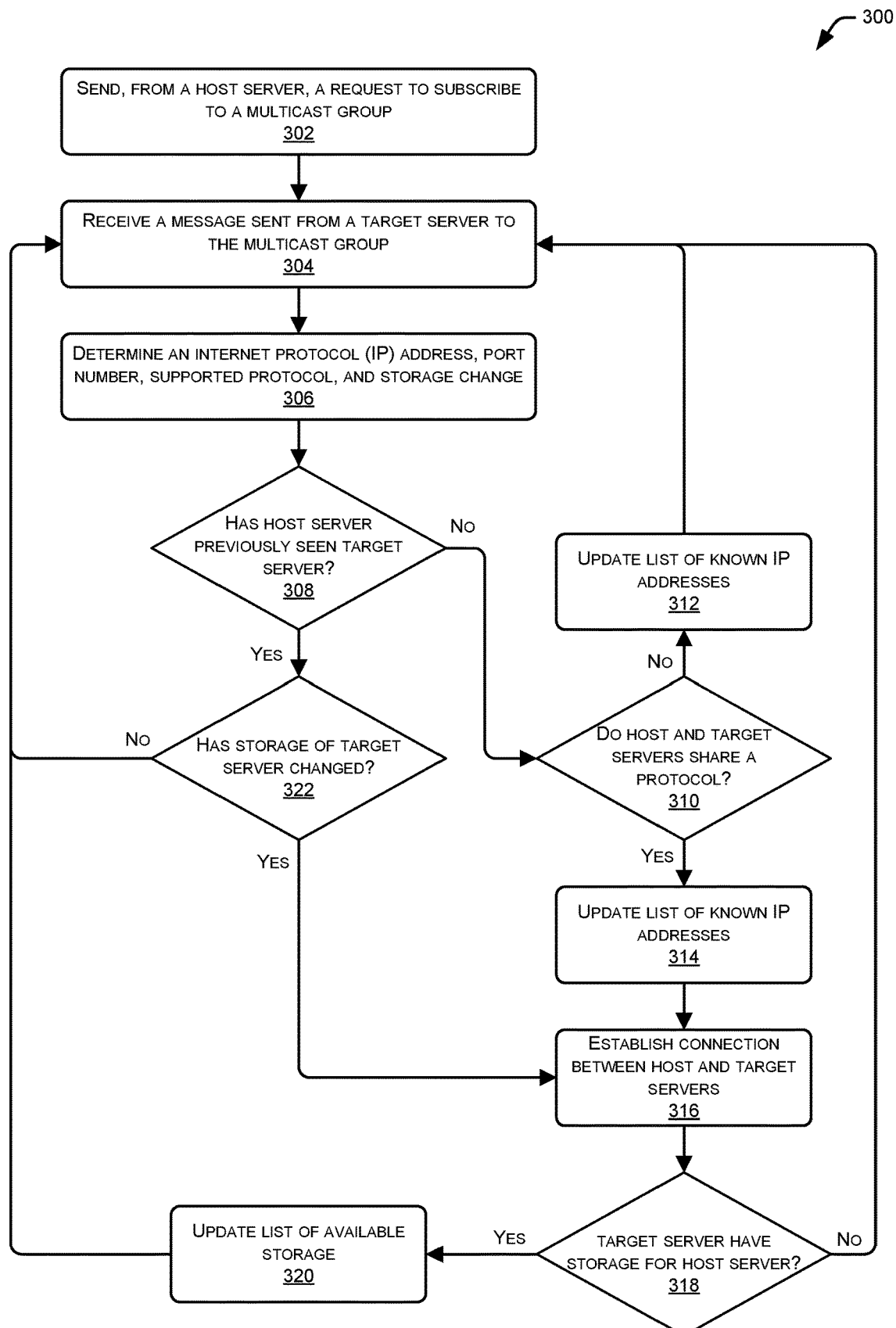
FIG. 3 illustrates a flow diagram of an example method for providing a dynamic-discovery process to a host server attempting to locating available storage within a network, such as a virtual local area network (VLAN).

FIG. 3 illustrates a flow diagram of an example method 300 for providing a dynamic-discovery process to a host server attempting to locating available storage within a network, such as a virtual local area network (VLAN). This method, and other methods described below, may be implemented (1) as a sequence of computer-implemented acts or program modules running on a computing system and/or (2) as interconnected machine logic circuits or circuit modules within the computing system. Further, while the following methods are described as being performed by an example host server, it is to be appreciated that one or more other computing devices may additionally or alternatively perform some or all of these operations.

An operation 302 represents sending, from a host server, a request to subscribe to a multicast group to which target servers send periodic advertisement messages. In some instances, a network component may receive this request, update the multicast group to include the IP address of the host server, and distribute the updated group information to other network components in the network.

At an operation 304, the host server may receive a message sent from a target server to the multicast group. This message may comprise an advertisement message as described above and, thus, may include information such as an IP address of the target server, a port number over which the target server establishes storage-request connections, an indication of whether storage of the target server has changed since the sending of the last advertisement message, one or more protocols supported by the target server, and/or the like.

At an operation 306, the host server determines information from the message, such as the IP address of the target server, the port number, one or more supported protocols, and whether the message indicates that storage of the target server has recently changed. An operation 308, meanwhile, represents determining, by the host server, whether the host server has previously seen the target server that sent the message. This may include determining whether the IP address specified in the message is already listed in a list of known targets maintained by the host server.

If the host server determines that it has not previously seen the target server, then the method 300 may proceed at an operation 310, to determine whether the host server also supports a protocol (e.g., a storage protocol, a transport protocol, and/or the like) specified in the message as a supported protocol (e.g., a storage protocol, a transport protocol, and/or the like) of the target server. If the host server does not support such a protocol, then the method 300 may proceed to an operation 312, which represents the host server updating the list of known target-server IP address. The method 300 then proceeds back to receiving one or more subsequent messages from one or more other target servers at the operation 304.

If, however, the host server determines at the operation 310 that it does support a protocol supported by the target server, then the method 300 proceeds to an operation 314 (updating the list of known target-server IP addresses) as well as an operation 316, which represents establishing a connection with the target server using the IP address, port number, and/or protocol specified in the message.

At an operation 318, the host server may determine whether the target server offers storage for the host server. If so, then at an operation 320 the host server updates a list of target servers that offer storage for the host server. For example, the host server may update the list to include the IP address, port number, and protocol associated with the target server. The method 300 may then proceed back to the operation 304. If, however, the host server determines, from the connection, that the target server does not offer storage for the host server, then the method 300 may simply proceed back to the operation 304 without updating the list of available storage.

Returning to the operation 308, if the host server determines that it has previously seen the target server associated with the message, then the method 300 may proceed to an operation 322. Here, the host server may determine whether the message indicates that the available storage of the target server has recently changed, such as from the last time that the target server sent an advertisement message. In some instances, this operation may include the host server determining whether a flag within the message has been set. If not, then the method 300 may proceed back to the operation 304. If the host server determines that the message indicates that the storage has recently changed, however, then the method 300 may proceed to establish a connection with the target server at the operation 316.

Figure 4:
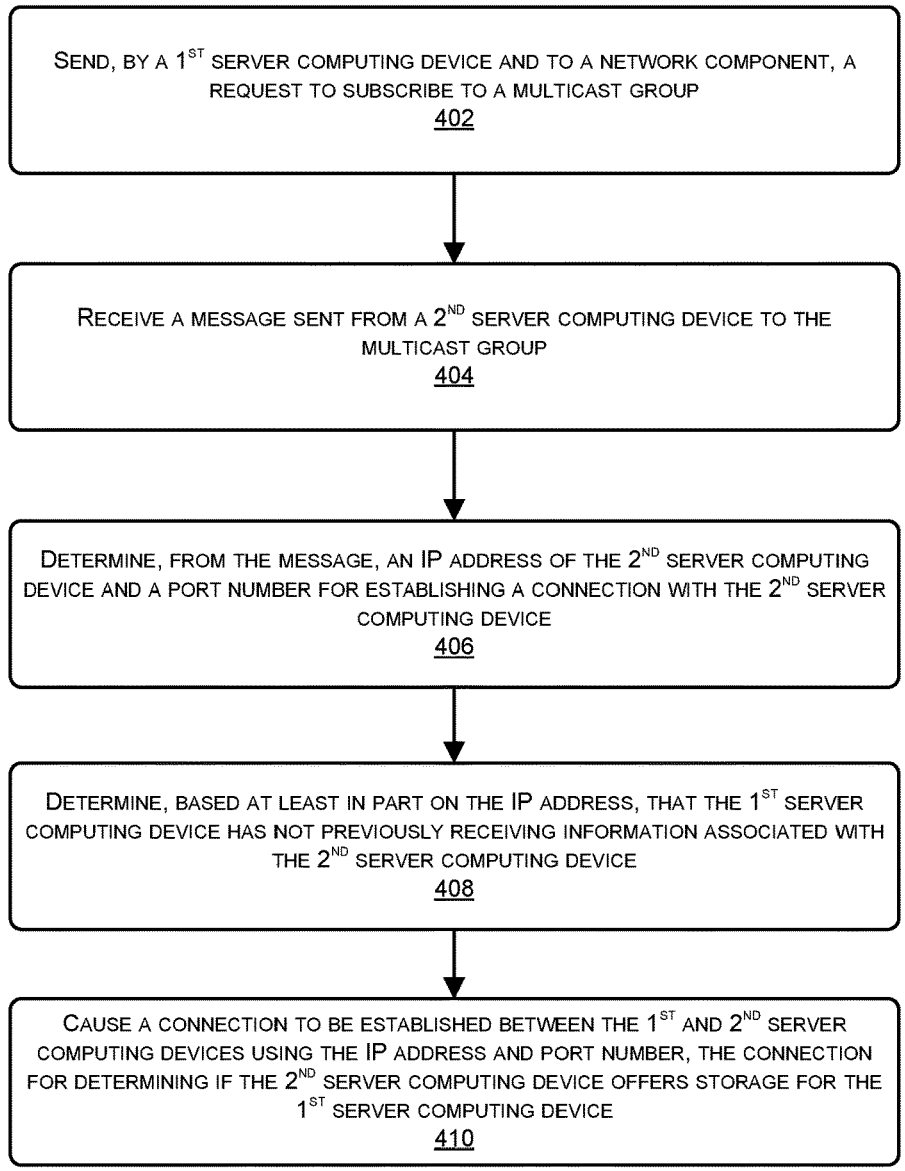
FIG. 4 illustrates a flow diagram of an example method in which a first server computing device establishes a connection with a second server computing device for determining whether the second server computing device offers storage for the first server computing device. In this example, the first server computing device establishes a connection with the second server computing device at least partly in response to determining that the first server computing device has not previously established a connection with the second server computing device.

FIG. 4 illustrates a flow diagram of an example method 400 in which a first server computing device establishes a connection with a second server computing device for determining whether the second server computing device offers storage for the first server computing device. In this example, the first server computing device establishes a connection with the second server computing device at least partly in response to determining that the first server computing device has not previously established a connection with the second server computing device.

An operation 402 represents sending, from a first server computing device and to a network component, a request to subscribe to a multicast group. In response to receiving this request, the network component may add the IP address of the first server computing device to the specified multicast group. In addition, the network component may distribute this updated group information to other network components in the environment.

An operation 404 represents receiving, at the first server computing device, a message sent from a second server computing device to the multicast group. For example, the message may comprise a periodic advertisement message sent from the second server computing device, with the advertisement message specifying an IP address of the second server computing device, a port number over which the second server computing device establishes storage-protocol connections, one or more protocols supported by the second server computing device, whether the storage of the second server computing device has recently changed, and so forth.

An operation 406 represents determining, by the first server computing device and from the message, an internet protocol (IP) address associated with the second server computing device and a port number for establishing a connection to the second server computing device.

An operation 408, meanwhile represents determining, based at least in part on the IP address, that the first server computing device has not previously received information associated with the second server computing device. For example, this operation may represent determining that the first server computing device has not previously received an advertisement message from the second server computing device and, thus, that the IP address of the second server computing device is not included in a list of known server computing devices. In some instances, the first server computing device may also update a list of known IP addresses in response to determining that the first server computing device has not previously received information from the second computing device.

An operation 410 represents causing a connection to be established between first server computing device and the second server computing device using the IP address and the port number, the connection for determining whether the second server computing device offers storage for the first server computing device. If the first server computing device determines that the second server computing device offers storage for the first server computing device, then the first server computing device may update a list of available storage for later use by the first server computing device. It is noted that while this method 400 describes establishing a connection with the second server computing device in response to determining that the first server computing device has not previously received information associated with the second server computing device, in some instances the method may also include determining a protocol supported by the second server computing device, determining that the first server computing device also supports the protocol supported by the second server computing device, and at least partly establishing the connection in response to this latter determination. Further, in instances where the first server computing device has previously received information from the second server computing device, the first server computing device may nonetheless establish a connection in response to determining, from the message, that an amount of storage of the second server computing device has changed.

Figure 5:
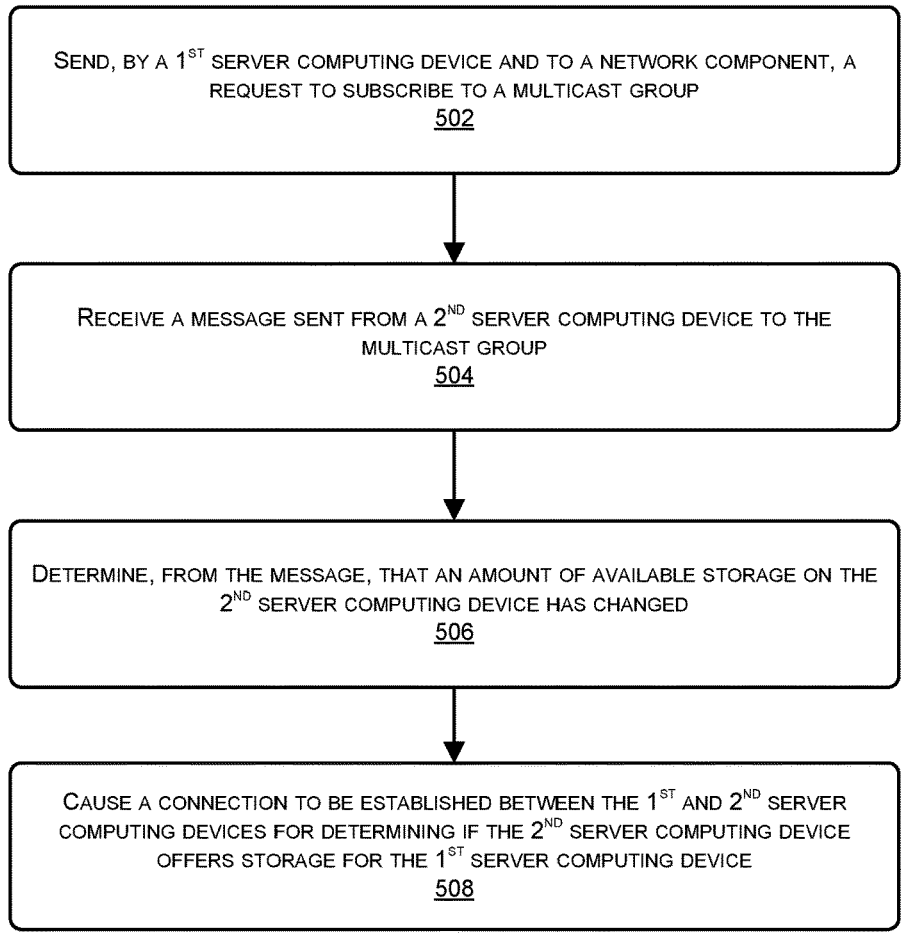
FIG. 5 illustrates a flow diagram of another example method in which a first server computing device establishes a connection with a second server computing device for determining whether the second server computing device offers storage for the first server computing device. In this example, the first server computing device establishes a connection with the second server computing device at least partly in response to determining that an amount of available storage on the second server computing device has changed.

FIG. 5 illustrates a flow diagram of another example method 500 in which a first server computing device establishes a connection with a second server computing device for determining whether the second server computing device offers storage for the first server computing device. In this example, the first server computing device establishes a connection with the second server computing device at least partly in response to determining that an amount of available storage on the second server computing device has changed.

An operation 502 represents sending, from a first server computing device and to a network component, a request to subscribe to a multicast group. In response to receiving this request, the network component may add the IP address of the first server computing device to the specified multicast group. In addition, the network component may distribute this updated group information to other network components in the environment.

An operation 504 represents receiving, at the first server computing device, a message sent from a second server computing device to the multicast group. For example, the message may comprise a periodic advertisement message sent from the second server computing device, with the advertisement message specifying an IP address of the second server computing device, a port number over which the second server computing device establishes storage-protocol connections, one or more protocols supported by the second server computing device, whether the storage of the second server computing device has recently changed, and so forth.

An operation 506 represents determining, by the first server computing device and from the message, that an amount of available storage on the second server computing device has changed. This may include determining that a flag has been set in the message sent from the second server computing device, the flag indicating that at least one storage space has been added or deleted at the second server computing device.

An operation 508, meanwhile, represents causing a connection to be established between first server computing device and the second server computing device for determining whether the second server computing device offers storage for the first server computing device. In some instances, this connection may be established at least partly in response to determining that the amount of available storage on the second computing device has changed. Further, in some instances the message may specify an IP address and port number of the second server computing device, which the first server computing device may use to establish the connection.

Figure 6:
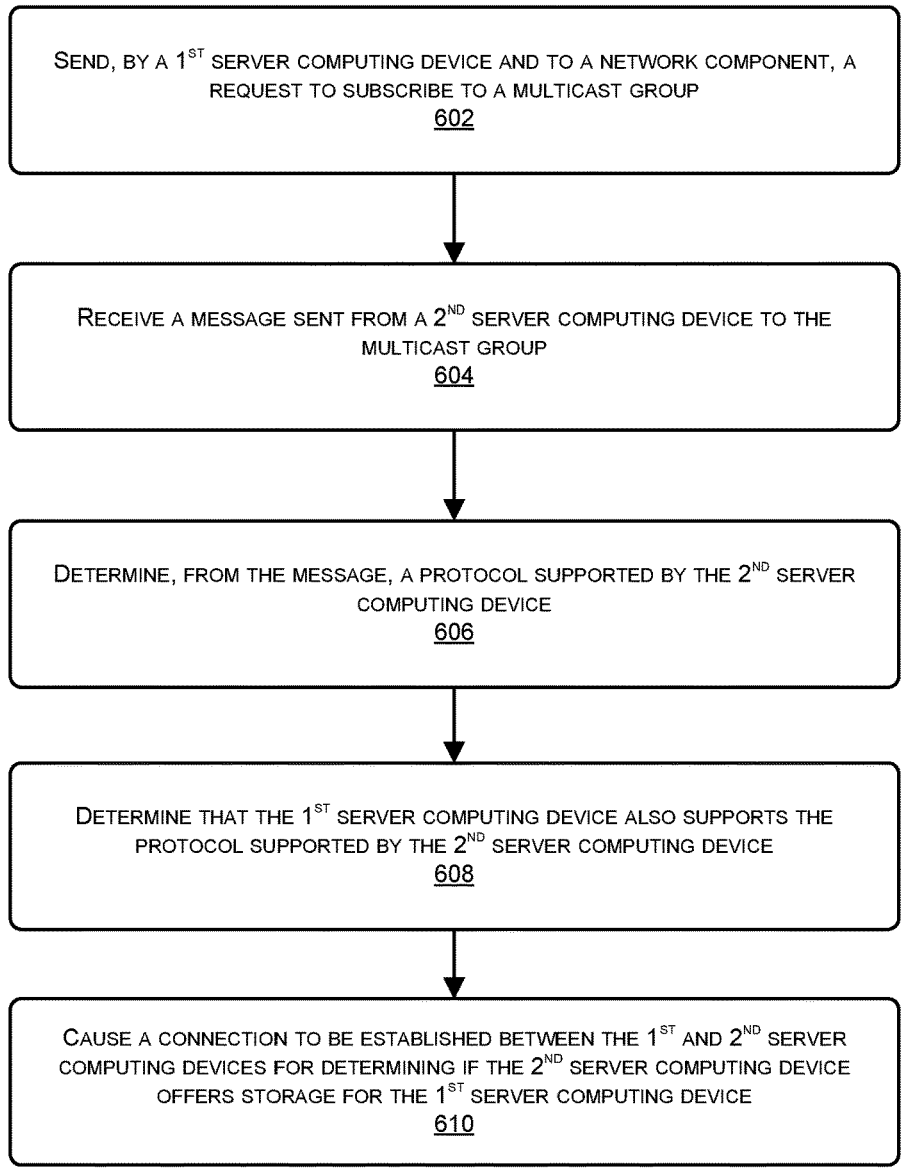
FIG. 6 illustrates a flow diagram of another example method in which a first server computing device establishes a connection with a second server computing device for determining whether the second server computing device offers storage for the first server computing device. In this example, the first server computing device establishes a connection with the second server computing device at least partly in response to determining that the first server computing device supports a transport protocol also supported by the first server computing device.

FIG. 6 illustrates a flow diagram of another example method in which a first server computing device establishes a connection with a second server computing device for determining whether the second server computing device offers storage for the first server computing device. In this example, the first server computing device establishes a connection with the second server computing device at least partly in response to determining that the first server computing device supports a protocol (e.g., a storage protocol, a transport protocol, and/or the like) also supported by the first server computing device.

An operation 602 represents sending, from a first server computing device and to a network component, a request to subscribe to a multicast group. In response to receiving this request, the network component may add the IP address of the first server computing device to the specified multicast group. In addition, the network component may distribute this updated group information to other network components in the environment.

An operation 604 represents receiving, at the first server computing device, a message sent from a second server computing device to the multicast group. For example, the message may comprise a periodic advertisement message sent from the second server computing device, with the advertisement message specifying an IP address of the second server computing device, a port number over which the second server computing device establishes storage-protocol connections, one or more protocols supported by the second server computing device, whether the storage of the second server computing device has recently changed, and so forth.

An operation 606 represents determining, by the first server computing device and from the message, a protocol supported by the second server computing device. An operation 608, meanwhile, represents determining, by the first server computing device, that the first server computing device also supports the protocol supported by the second server computing device.

An operation 608 represents causing a connection to be established between first server computing device and the second server computing device for determining whether the second server computing device offers storage for the first server computing device. In some instances, this operation occurs at least partly in response to determining that the first server computing device also supports the protocol supported by the second server computing device.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3-6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7:
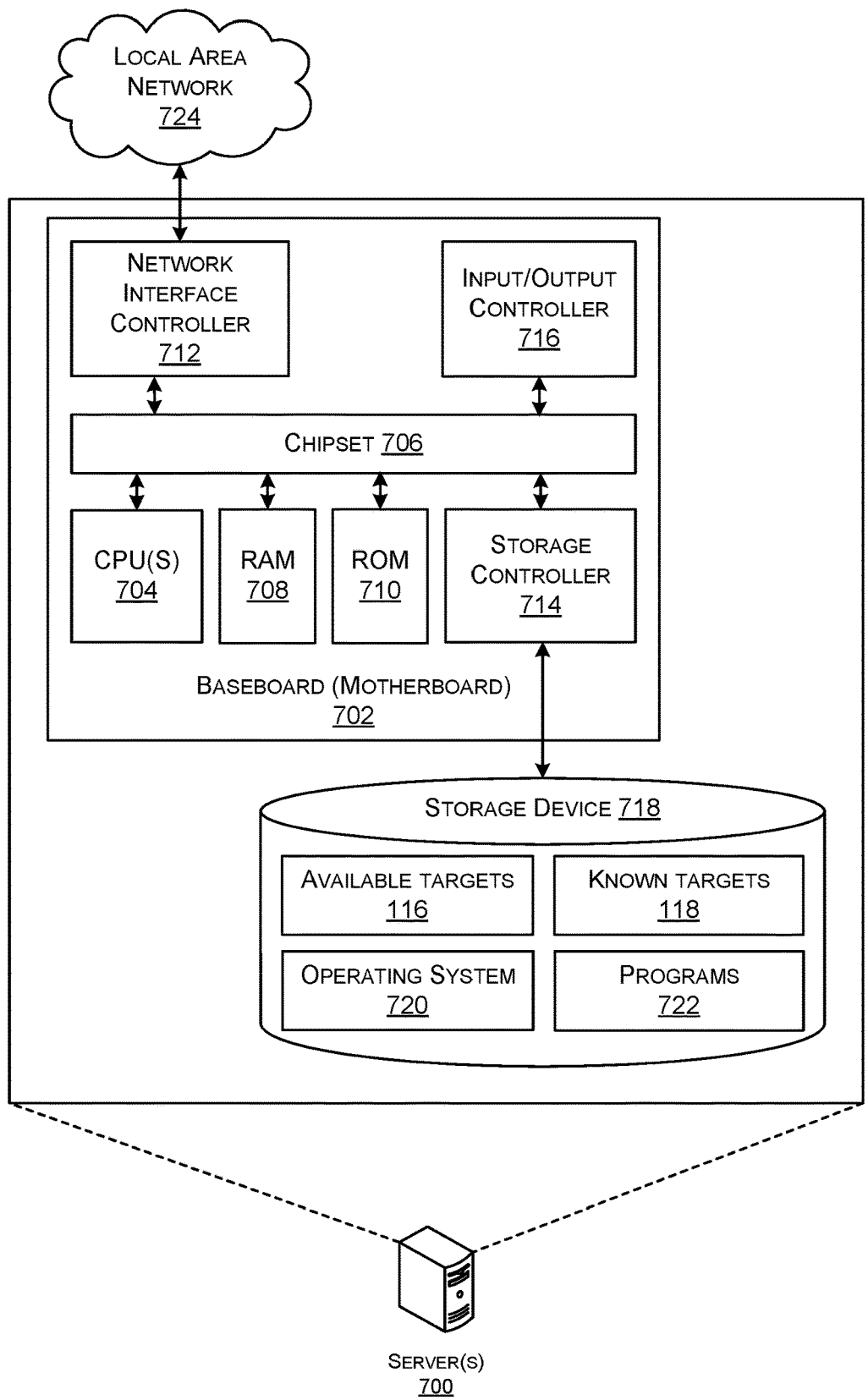
FIG. 7 is a computer architecture diagram showing an illustrative computer hardware architecture for implementing a server computing device that can be utilized to implement aspects of the various technologies presented herein.

FIG. 7 is a computer architecture diagram showing an illustrative computer hardware architecture for implementing a server computing device 700 that can be utilized to implement aspects of the various technologies presented herein. The host and/or target servers 102 and 104, discussed above, may include some or all of the components discussed below with reference to the server computing device 700.

To begin, the server computer 700 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 700 can also be configured to execute a resource manager capable of instantiating and/or managing the computing resources. In the case of VM instances, for example, the resource manager can be a hypervisor or another type of program configured to enable the execution of multiple VM instances on a single server computer 700. Server computers 700 in a data center can also be configured to provide network services and other types of services.

The server computer 700 includes a baseboard 702, or "motherboard," which is a printed circuit board to which a multitude of components or devices can be connected by way of a system bus or other electrical communication paths. In one illustrative configuration, one or more central processing units (CPUs) 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as a local area network 724. The chipset 706 can include functionality for providing network connectivity through a Network Interface Card (NIC) 712, such as a gigabit Ethernet adapter. The NIC 712 is capable of connecting the computer 700 to other computing devices over the network. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI (SAS) interface, a serial advanced technology attachment (SATA) interface, an FC interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 2-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The server computer 700 may also store, in the storage device 718, the datastores 116 and 118, described above. That is, the storage device 718 may maintain, in the datastore 116, information regarding target server computing devices that a host server computing device may utilize for storage purposes. In addition, the storage device 718 may maintain, in the datastore 118, information regarding known target server computing devices; that is, those target server computing devices for which a host server computing device has received information, such as an IP address, port number, supported protocol, and/or the like.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A first server computing device, comprising:
one or more processors; and
one or more non-transitory computer-readable media storing computer-executable instructions that, when executed by the one or more processors, cause the one or more processors to perform acts comprising:
storing a list for indicating one or more server computing devices that offer storage for the first server computing device;
sending, to a network component, a request to subscribe to a multicast group;
receiving a message, sent from a second server computing device to the multicast group, specifying an internet protocol (IP) address associated with the second server computing device, a port number for connecting to the second server computing device, a protocol supported by the second server computing device, and an indication of whether an amount of storage on the second server computing device has changed;
determining, from the message, the IP address, the port number, and the protocol supported by the second server computing device;
determining, based at least in part on the IP address, that the first server computing device has not previously received information associated with the second server computing device;
determining that the first server computing device also supports the protocol supported by the second server computing device; and
in response to determining that the first server computing device has not previously received information associated with the second server computing device and that the first server computing device also supports the protocol supported by the second server computing device:
causing a connection to be established between the first server computing device and the second server computing device using the IP address and the port number;
determining, via the connection, that the second server computing device offers storage for the first server computing device; and
updating the list to indicate that the second server computing device offers storage for future use by the first server computing device.

2. The first server computing device as recited in claim 1, wherein:
the acts further comprise determining that a list of IP addresses of respective server computing devices to which the first server computing device has previously received information does not include the IP address associated with the second server computing device;
the determining that the first server computing device has not previously received information associated with the second server computing device is based at least in part on the determining that the list of IP addresses does not include the IP address associated with the second server computing device; and
the acts further comprise updating the list of IP addresses to indicate the IP address associated with the second server computing device.

3. The first server computing device as recited in claim 1, wherein updating the list comprises storing, in the list, an indication of the IP address, the port number, and a storage space of the second server computing device that offers storage for the first server computing device.

4. The first server computing device as recited in claim 1, the acts further comprising:
receiving a message sent from a third server computing device to the multicast group; and
determining from the message sent from the third server computing device, an IP address associated with the third server computing device, a port number for establishing a connection to the third server computing device, and that an amount of available storage on the third server computing device has changed.

5. The first server computing device as recited in claim 4, the acts further comprising causing, based at least in part on the determining that the amount of available storage on the third server computing device has changed, a connection to be established between the first server computing device and the third server computing device using the IP address associated with the third server computing device and the port number for establishing a connection with the third server computing device.

6. The first server computing device as recited in claim 4, wherein:
the acts further comprise determining that a flag has been set in the message sent from the third server computing device, the flag indicating that at least one storage space has been added or deleted at the third server computing device; and
the determining that the amount of available storage on the third server computing device has changed comprises determining that the amount of available storage on the third server computing device has changed based at least in part on the determining that the flag has been set.

7. A method implemented at least in part by a first server computing device, the method comprising:
storing a list for indicating one or more server computing devices that offer storage for the first server computing device;
sending, from the first server computing device and to a network component, a request to subscribe to a multicast group;
receiving, at the first server computing device, a message sent from a second server computing device to the multicast group, the message indicating an internet protocol (IP) address associated with the second server computing device, a port number for connecting to the second server computing device, a protocol supported by the second server computing device, and an indication that an amount of available storage on the second server computing device has changed;
determining, from the message, that the amount of available storage on the second server computing device has changed;
determining that the first server computing device also supports the protocol supported by the second server computing device; and
in response to determining that the amount of available storage on the second server computing device has changed and that the first server computing device also supports the protocol supported by the second server computing device:
   causing a connection to be established between the first server computing device and the second server computing device;
   determining, via the connection, that the second server computing device offers storage for the first server computing device; and
   updating the list to indicate that the second server computing device offers storage for future use by the first server computing device.

8. The method as recited in claim 7, wherein the updating the list comprises storing, in the list, an indication of the IP address, the port number, and a storage space of the second server computing device that offers storage for the first server computing device.

9. The method as recited in claim 7, further comprising:
determining, from the message, the IP address and the port number;
and wherein the causing the connection to be established comprises causing the connection to be established between the first server computing device and the second server computing device using the IP address and the port number.

10. The method as recited in claim 7, further comprising:
receiving a message sent from a third server computing device to the multicast group;
determining from the message sent from the third server computing device, an IP address associated with the third server computing device;
determining, based at least in part on the IP address, that the first server computing device has not previously received information associated with the third server computing device; and
causing a connection to be established between the first server computing device and the third server computing device at least partly in response to determining that the first server computing device has not previously received information associated with the third server computing device.

11. The method as recited in claim 10, further comprising:
determining that a list of IP addresses of respective server computing devices to which the first server computing device has previously received information does not include the IP address associated with the third server computing device, wherein the determining that the first server computing device has not previously received information associated with the third server computing device is based at least in part on the determining that the list of IP addresses does not include the IP address associated with the third server computing device; and
updating the list of IP addresses to indicate the IP address associated with the third server computing device.

12. The method as recited in claim 7, further comprising:
determining that a flag has been set in the message sent from the second server computing device, the flag indicating that at least one storage space has been added or deleted at the second server computing device;
and wherein the determining that the amount of available storage on the second server computing device has changed comprises determining that the amount of available storage on the second server computing device has changed based at least in part on the determining that the flag has been set.

13. A method implemented at least in part by a first server computing device, the method comprising:
storing a list for indicating one or more server computing devices that offer storage for the first server computing device;
sending, to a network component, a request to subscribe to a multicast group;
receiving a message, sent from a second server computing device to the multicast group, indicating an internet protocol (IP) address associated with the second server computing device, a port number for connecting to the second server computing device, a protocol supported by the second server computing device, and an indication of whether an amount of storage on the second server computing device has changed;
determining, from the message, the IP address, the port number, and the protocol supported by the second server computing device;
determining, based at least in part on the IP address, that the first server computing device has not previously received information associated with the second server computing device;
determining that the first server computing device also supports the protocol supported by the second server computing device; and
in response to determining that the first server computing device has not previously received information associated with the second server computing device and that the first server computing device also supports the protocol supported by the second server computing device:
   causing a connection to be established between the first server computing device and the second server computing device;
   determining, via the connection, that the second server computing device offers storage for the first server computing device; and
   updating the list to indicate that the second server computing device offers storage for future use by the first server computing device.

14. The method as recited in claim 13, wherein the updating the list comprises storing, in the list, an indication of the IP address, the port number, and a storage space of the second server computing device that offers storage for the first server computing device.

15. The method as recited in claim 13, wherein:
the acts further comprise determining that a list of IP addresses of respective server computing devices to which the first server computing device has previously received information does not include the IP address associated with the second server computing device;
the determining that the first server computing device has not previously received information associated with the second server computing device is based at least in part on the determining that the list of IP addresses does not include the IP address associated with the second server computing device; and the acts further comprise updating the list of IP addresses to indicate the IP address associated with the second server computing device.

16. The method as recited in claim 13, further comprising:

determining, from the message, that the amount of available storage on the second server computing device has changed;

and wherein the causing the connection to be established comprises causing the connection to be established between the first server computing device and the second server computing device based at least in part on the determining that the amount of available storage on the second server computing device has changed.

17. The method as recited in claim 16, further comprising:

determining that a flag has been set in the message sent from the second server computing device, the flag indicating that at least one storage space has been added or deleted at the second server computing device;

and wherein the determining that the amount of available storage on the second server computing device has changed comprises determining that the amount of available storage on the second server computing device has changed based at least in part on the determining that the flag has been set.

* * * * *